United States Patent [19]

Watanabe

[11] 4,133,413
[45] Jan. 9, 1979

[54] ELEVATOR SAFETY DEVICE
[75] Inventor: Eiki Watanabe, Inazawa, Japan
[73] Assignee: Mitsubishi Denki Kabushiki Kaisha, Tokyo, Japan
[21] Appl. No.: 818,929
[22] Filed: Jul. 25, 1977
[30] Foreign Application Priority Data
Aug. 31, 1976 [JP] Japan .................. 51-103863
[51] Int. Cl.$^2$ ............................................. B66B 5/02
[52] U.S. Cl. ................................ 187/29 R; 318/368
[58] Field of Search ............... 187/29; 318/368; 361/15, 23, 33; 363/39, 46

[56] References Cited
U.S. PATENT DOCUMENTS

| 3,470,438 | 9/1969 | Krauer et al. ...................... 187/29 |
| 4,027,225 | 5/1977 | Eluin .................................. 363/39 |
| 4,030,570 | 6/1977 | Caputo ............................... 187/29 |

Primary Examiner—Robert K. Schaefer
Assistant Examiner—W. E. Duncanson, Jr.
Attorney, Agent, or Firm—Wenderoth, Lind & Ponack

[57] ABSTRACT

An armature of an electric motor for an elevator car is controllably driven by a three-phase source through a semiconductor converter controlled with a difference between a command and an actual car speed signal. A relay for sensing a ripple current from the converter is serially connected to a tuned filter across the armature. When a break occurs anywhere in a circuit with the motor armature, the sensor relay is deenergized and connects an emergency braking circuit across the armature. Alternatively the sensor relay may be connected via the filter to a reactor connected to the converter.

5 Claims, 4 Drawing Figures

ELEVATOR SAFETY DEVICE

BACKGROUNDS OF THE INVENTION

This invention relates to an elevator safety device.

In elevator systems the elevator car might stop midway between a pair of adjacent floors of a building served by the car and confine passengers therein. Without the car enabled to arrive at its desired floor. Alternatively the elevator car might rush at a high speed into a top or a bottom terminal floor. One of the reasons for this has been the occurrence of the bad electrical conduction on one portion of the main circuit arranged to safely supply to an associated electric hoist motor an electric power required for the elevator car to travel in the upward or downward direction. As the main circuit has many electric components serially interconnected, the same includes a multiplicity of terminals and the like connecting those components to one another. If contacting would have been deteriorated at any of the terminals by some rare accident then heat will be excessively generated at the deteriorated contact portion to fuse it. Accordingly the fused portion increases in resistance resulting in a fault that the electric motor becomes difficult to be smoothly supplied with the electric power.

As a result, elevator systems without the feedback control have shown signes that the landing accuracy decreases and/or passengers are uncomfortable to ride in the elevator car. This has aroused an attention of passengers or elevator service men. Therefore such a fault has easily been found before the control is disabled by the fully fusion of the bad contact portion. In feedback control elevator systems, however, the control system has been first operated to compensate for the increase in resistance as above described through the feedback control until the control is disabled upon the full fusion of the resistance increased portion. Thus the elevator car has increased in speed by means of an unbalanced force caused from the load to actuate an associated governor. This has resulted in an emergency that the elevator car stops midway between a pair of adjacent floors of a building served by the car and confines passenger therein. Alternatively the elevator car might rush into the top or bottom terminal floor while it is maintained at high speed resulting in large shocks giving the passengers. Thus the service men have frequently tended to find no fault as above described until the occurrence of the above-mentioned emergency. Particularly, upon the occurrence of an emergency that the elevator car has stopped midway between a pair of adjacent floors, an urgent expedient manually performed in the operation of rescuing the passengers from the elevator car stopped midway between a pair of adjacent floors has resulted in the car only falling down through the drawing-down due to a loading on the car. Thus the car has been impossible to be moved in the desired direction. Consequently, if the rescue operation is erroneously performed while the rescue persons do not know the break of the main circuit with the hoist motor for the car then it can not be said that there will be no danger that the elevator car would have fallen down.

There have been already proposed elevator safety devices for sensing the break of the main circuit for driving elevator cars. In known safety devices, the speed comparator involved might not be operated immediately in response of the sensed break of the main circuit and dependent upon what load is imposed on the elevator car. This has cooperated with an ergency terminal speed limiting device disposed on either of the top and bottom terminal floors to cause a great failure such as damage to an associated buffer.

Accordingly it is an object of the present invention to provide a new and improved elevator safety device ensuring that an elevator car is prevented from accelerating to dangerous speed upon the break of the main circuit for driving the car.

SUMMARY OF THE INVENTION

The present invention provides an elevator safety device comprising an elevator car, a source of alternating current, a controlled semiconductor converter connected to the source of alternating current, an electric motor driven by the source and controlled by the semiconductor converter to travel the elevator car, a ripple sensor circuit operative with a ripple current produced by the semiconductor converter and inoperative in response to the disappearance of the ripple current, and an emergency braking circuit for urgently braking the electric motor in response to the ripple sensor circuit being brought into its inoperative state.

Preferably the ripple sensor circuit may include a filter formed of a reactor and a capacitor serially interconnected to be tuned to a frequency of the ripple current, a resistor serially connected to the filter to damping the filter, a rectifier circuit connected across the resistor, and a ripple sensor relay connected across a pair of outputs of the rectifier circuit.

Advantageously the emergency braking circuit may include a dynamic braking circuit formed of at least a set of contacts and a dynamic braking resistor serially connected across an armature of the electric motor to apply a dynamic braking torque to an armature of the electric motor.

BRIEF DESCRIPTION OF THE DRAWINGS

The present invention will become more readily apparent from the following detailed description taken in conjuction with the accompanying drawings in which.

Throughout the Figures like reference numerals designate the identical or corresponding components.

DESCRIPTION OF THE PREFERRED EMBODIMENTS

Figure 1:
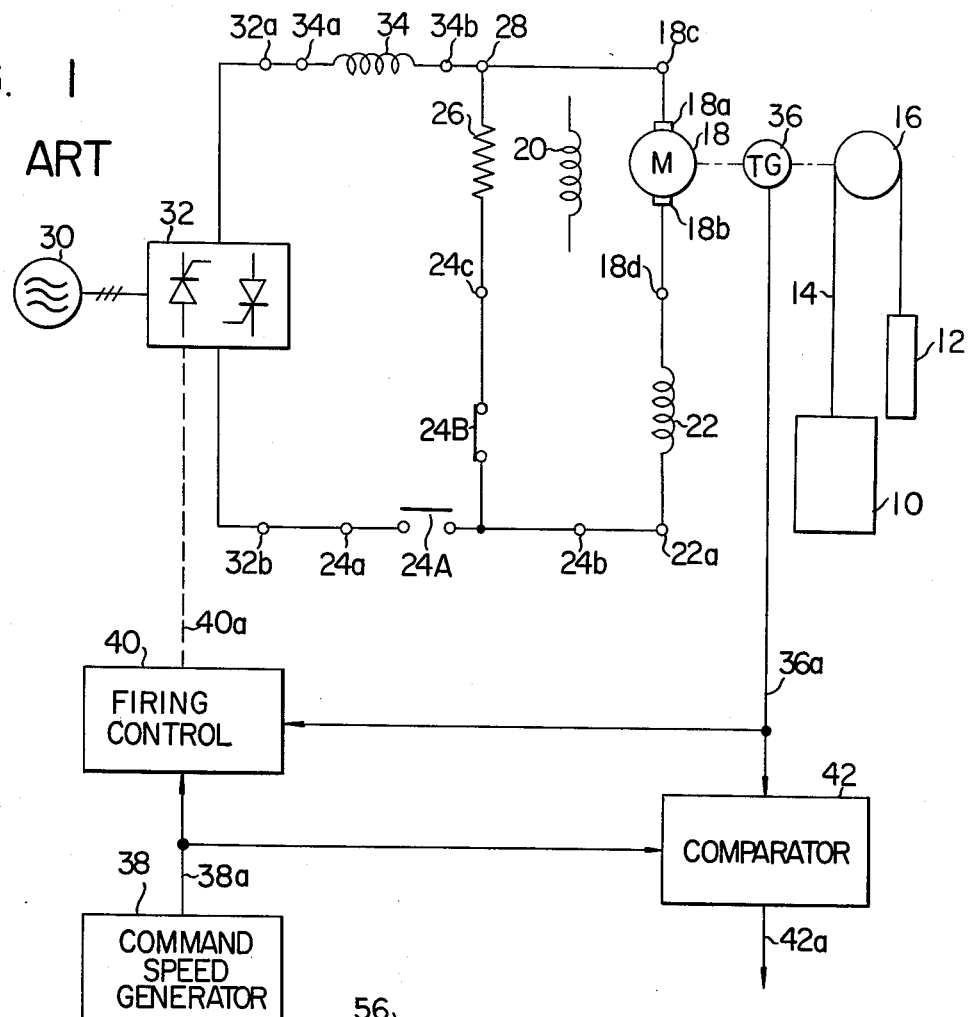
FIG. 1 is a schematic circuit diagram of an elevator system including an elevator safety device constructed in accordance with the principles of the prior art.

Referring now to FIG. 1 of the drawings, there is illustrated an elevator system provided with an elevator safety device constructed in accordance with the principles of the prior art. The arrangement illustrated comprises an elevator car 10 connected to a counter weight 12 through a rope 14 trained over a sheave 16 and an armature 18 of a reversible direct current motor for driving the sheve 16 and therefore the elevator car 10, a pair of brushes 18a and 18b contacting the armature 18, a pair of terminals 18c and 18d for the armature 18, a field winding 20, and an interpole winding 22 connected between the armature terminal 18d and an interpole terminal 22a.

The arrangement further includes a set of normally open contacts 24A and a set of normally closed contacts 24B of a main contactor (not shown) disposed in the circuit driving the electric motor.

The set of contacts 24A is connected between a contact terminal 24a and another contact terminal 24b subsequently connected to the interpole terminal 22a and the set of contacts 24B is connected on one side to the contact terminal 24b and on the other side to a contact terminal 24c. Then a dynamic braking resistor 26 is connected at one end to the contact terminal 24c and at the other end to the armature terminal 18c through junction 28.

A source of alternating current 30 shown in FIG. 1 as being of a three phase is connected to the semiconductor converter 32 including semiconductor devices such as thyristors. The converter 32 normally includes twelve thyristors and six fuses having respective terminals although the thyristors, fuses and terminals are not illustrated only for purposes of illustration. However the semiconductor converter 32 is shown in FIG. 1 as being of full-wave rectification type and includes a pair of terminals 32a and 32b. The terminal 32a is connected to a direct current reactor 34 through a terminal 34a and the terminal 32b is connected to the contact terminal 24a. The reactor 34 is connected via a terminal 34b to the junction 28.

Further a tachometer generator 36 is connected to the motor armature 18 to be driven thereby and produces an actual speed signal 36a representive of the actual speed of the elevator car 10.

A command speed generator circuit 38 generates a command speed signal 38a which is, in turn, supplied to both a firing control circuit 40 and a comparator circuit 42. Both circuits 40 and 42 are also supplied with the actual speed signal 36a from the tachometer generator 36. Thus the comparator circuit 42 compares the command speed signal 38a with the actual speed signal 36a to produce an output 42a for the purpose as will be apparent later. The firing control circuit 40 is responsive to the command and actual speed signals 38a and 36a respectively to supply a firing signal 40a to the converter 32 to control the firing of the thyristor (not shown) disposed in the converter 32.

Before the start of the elevator car 10, the set of contacts 24A is in its closed position while the set of contact 24B is in its open position. In operation an alternating current power from the source 30 is converter to a direct current voltage by the converter 32 and then applied to the armature 18 of the driving motor through the reactor 34. This causes the armature 18 to be rotated thereby to drive the elevator car 10 through the sheave 16 in either one of the upward and downward directions as the case may be. The rotation of the armature 18 also causes the tachometer generator 36 to generate the actual speed signal 36a while the firing control circuit 4o generates a firing signal 40a as determined by a difference between the command and actual speed signals 38a and 36a respectively. The firing signal 40a controls the converter 32 with the results that armature 18 or the elevator car 10 is has a speed controlled in accordance with the command speed signal 38a with a high accuracy. It is noted that in the normal mode of operation a difference between the command and actual speed signals 38a and 36a respectively is maintained at a magnitude equal to or less than a predetermined magnitude resulting in no output 42a from the comparator 42.

If the main circuit for driving the amature 18 and therefore the elevator car 10 is broken anywhere during the travel of the elevator car 10 then no voltage is applied to the armature 18. As a result, the armature 18 has a rotational speed not following up the command speed signal 38a. Thus the difference between the command and actual speed signals 38a and 36a becomes larger until it exceeds the predetermined magnitude. At that time the comparator 42 produces its output 42a that is operated to deenergize the main contactor (not shown) in the main circuit.

This deenergization of the contactor causes the opening of the contact set 24A and the closure of the contact set 24B. Thus the armature 18 is disconnected from the converter 32 and instead connected to a dynamic braking circuit including the dynamic braking resistor 26 and the set of now closed contacts 24B, resulting in the application of a dynamic braking torque to the armature 18. At the same time, a friction brake (not shown) is actuated whreby the two apply an emergency braking action to the armature 18 resulting in the stoppage of the elevator car 10.

The arrangement of FIG. 1 might cause a danger because the comparator circuit 42 would not be immediately operated dependent upon what load is imposed to the elevator car 10. Particularly, it has been required to pay attention with a buffer (not shown) used in conjunction with an emergency terminal speed limiting device disposed at either of the top and bottom terminal floors of an associated building, the buffer having an operating stroke shorter than that requiredupon the elevator car.

Figures 2, 3:
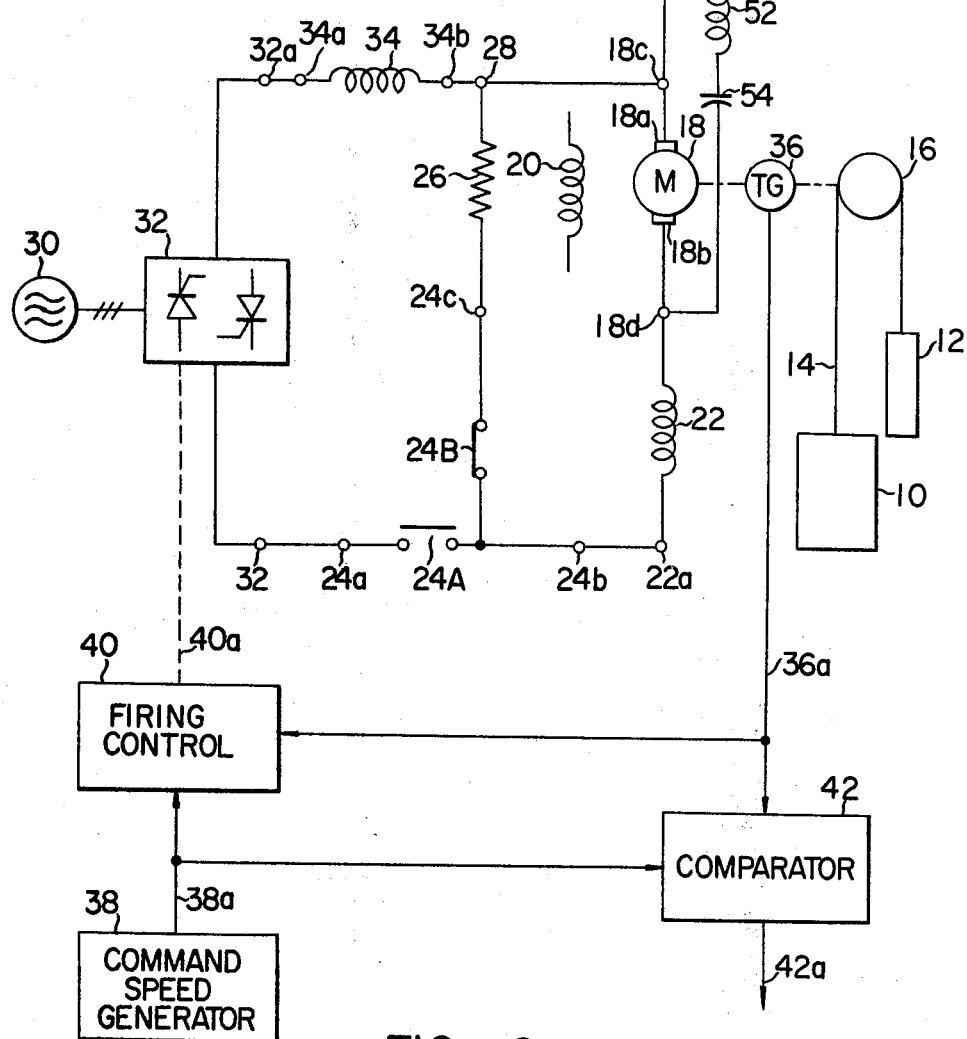
FIG 2 is a graph useful in explaining the operation of the arrangement shown in FIG. 1 with the main circuit for driving the elevator car partly broken.
FIG. 3 is a schematic circuit diagram of an elevator system including an elevator safety device constructed in accordance with the principles of the present invention.

The emergency terminal speed limiting device will now be described with reference to FIG. 2. In FIG. 2 the elevator car is started from a floor designated by the reference A and accelerated to a maximum speed B following a normal speed curve $\overrightarrow{AB}$ and then decelerated along a normal speed curve $\overrightarrow{BO}$ to a null magnitude at a terminal floor 0 where the car is stopped. The reference character N designates a position where the elevator car will strike against the buffer disposed at that terminal floor 0 and horizontal broken line $\overline{XX'}$ designates a car speed at which an overspeed switch of a governor (not shown) is operated. Also the emergency terminal speed limiting device is so designed and constructed that, when the elevator car has a speed higher than a speed designated by horizontal broken line $\overline{YY'}$ even after its passage through a point Z, an emergency braking torque is immediately applied to the armature 18 and the therefore the car 10 to reduce to a speed not higher than a maximum striking speed for the buffer before the car 10 will strike against the buffer. Therefore the speed $\overline{YY'}$ is selected to be equal to or less than the maximum striking speed for the buffer.

As above described, an emergency braking action results from both the dynamic braking and the friction braking. If the contact terminal 24b is broken during the descent of the car under heavy loading then the elevator car freely falls down as shown by broken line $\overrightarrow{AC}$. Under these circumstances, the resulting acceleration depends upon an inertia of the particular moving system and/or a load within the car 10 and the car under heavy loading is accleration with a magnitude of 1 to 1.5 meters per second. Then the emergency terminal speed limiting device disposed at an associated one of the top and bottom terminal floors is actuated at a car speed of C to apply an emergency braking action to the motor armature and therefore the car. In this case, as the dynamic braking torque is not applied to the armature, the car strikes against the buffer at a speed exceeding the maximum striking speed for the latter as shown by broken line $\overline{CD}$ in FIG. 2. This has resulted in the occurrence of a great failure such as a damage to the buffer or the like.

The present invention contemplates to eliminate the objections as above described by the provision of an elevator safety device ensuring that an elevator car is prevented from accelerating to a dangerous speed upon the break of the main circuit for driving an elevator car.

Refering now to FIG. 3, there is illustrated one embodiment of the present invention. The arrangement illustrated is different from that shown in FIG. 1 only in that in FIG. 3 a safety device is connected across the terminals 18c and 18d for the armature 18. As shown in FIG. 3, the safety device includes a resistor 50, a reactor 52, and a capacitor 54 serially interconnected in the named order, a bridge type full-wave rectifier circuit 56 including a pair of input terminals connected across the resistor 50 and a winding of 58 of a ripple sensor relay connected across a pair of output terminals of the rectifier circuit 56. The ripple sensor relay senses a ripple current from the converter 32. When the deenergized, that relay is operative to deenergize the main contactor (not shown).

The reactor 52 and the capacitor 54 form a filter preventing a ripple current produced by the converter 32 from flowing into the armature 18 and also suppressing noise generated by the armature 20. With the converter 32 put in the three-phase Greatz connection, it produces a ripple current having a frequency equal six times a source frequency applied thereto. For example, when the source 30 has a source frequency of 50 hertzs, the magnitudes of the reactor 52 and the capacitor 54 are selected to tune the filter 52 – 54 to a frequency of 300 hertzs. The resistor 50 serves to damp the filter 52 – 54.

When the main circuit is operated in the normal mode, the ripple current generated by the converter 32 and having its frequency equal to six times the frequency of the source 30 is caused to flow through the resistor 50 and the filter 52 – 54. A ripple voltage developed across the resistor 50 due to the ripple current flowing therethrough is full-wave rectified by the rectifier circuit 56 to energize the relay winding 58. Therefore the main contactor (not shown) is maintained energized to keep the contact sets 24A and 24B in the closed and open positions respectively whereby the elevator car travels as determined by the command speed signal 38a from the command speed generator circuit 38.

If any portion of the main circuit is broken then the ripple current is not supplied to the rectifier circuit 56 resulting in the deenergization of the relay winding 58 and hence the main contactor (not shown). This means that the contact set 24A is opened while the contact set 24B is closed to apply an emergency braking torque to the armature 18 as above described in conjunction with FIGS. 1 and 2.

In the arrangement of FIG. 3 it is to be noted that if a current path extending from the brush terminal 18c to the brush terminal 18b through the armature 18 is broken anywhere, this break can not be sensed unless a current path traced from the converter 32 through the reactor 34, the junction 28, the brush terminal 18c, the resistor 50, the reactor 52, the capacitor 54, the interpole winding 22, the interpole terminal 22a and thence to the converter 32 is broken.

Figure 4:
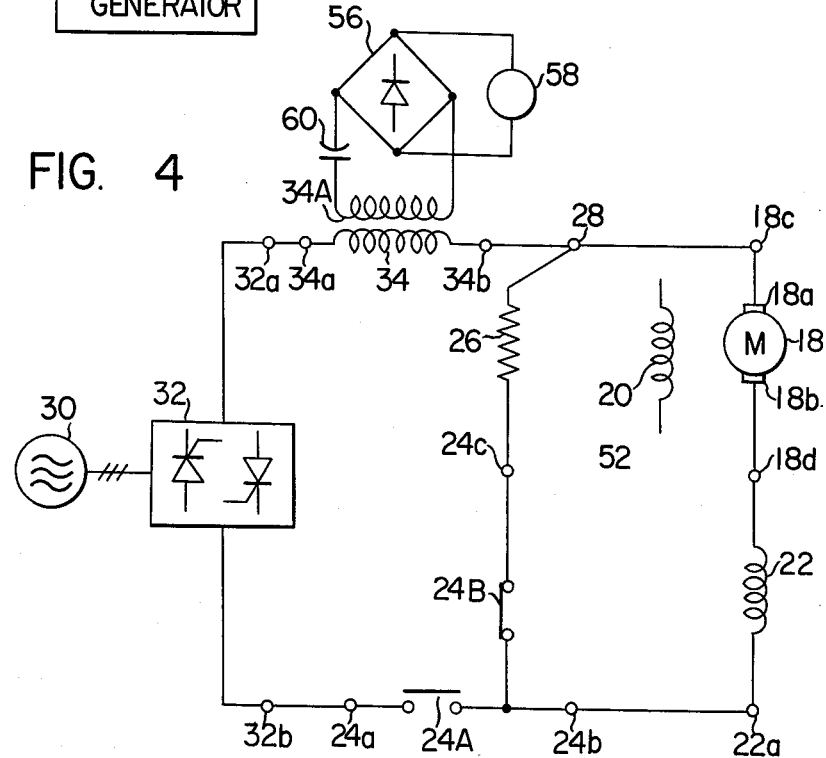
FIG. 4 is a diagram similar to FIG. 3 but illustrating a modification of the present invention.

FIG. 4 shows another modification of the present invention wherein the objections just described is eliminated. The arrangement illustrated is different from that shown in FIG. 3 only in that in FIG. 4 the rectifier circuit 56 with the relay winding 58 is connected across a filter including a direct current reactor 34A and a capacitor 60 and the reactor 34A is magnetically coupled to the reactor 34 with the circuit 50, 52, 54 omitted. The reactor 34A and the capacitor 60 forms another filter tuned to a frequency equal to six times the frequency of the source 30 that is to say, the frequency of the ripple current from the converter 32. As in the arrangemet of FIG. 3, the rectifier circuit 56 has a pair of output terminals connected across the relay winding 58.

it is seen that if a break occurs anywhere in the arangement of FIG. 4 that no ripple current is induced across the reactor 34A to deenergize the relay winding 58. Therefore an emergency braking torque is immediately applied to the armature 18 and accordingly to the elevator car 10.

From the foregoing it is seen that the present invention provides an elevator safety device by which, when a ripple current produced from a semiconductor converter is sensed, an electric motor and hence an elevator car is operated in the normal mode and an emergency braking torque is immediately applied to the electric motor in response to the absence of the sensed ripple current. Therefore the present invention can prevent the elevator car from accelerating to a dangerous speed upon a break of the main circuit.

What is claimed is:

1. An elevator safety device comprising an elevator car, a source of alternating current, a controlled semiconductor converter connected to said source of alternating current a reversible electric motor controllably driven by said source through said controlled semiconductor converter to travel said elevator car, a ripple sensor circuit operative with a ripple current produced by said semiconductor converter and inoperative in response to the disappearance of said ripple current, and an emergency braking circuit for urgently braking said electric motor in response to said ripple sensor circuit being brought into its inoperative state.

2. An elevator safety device as claimed in claim 1 wherein said ripple sensor circuit includes a filter formed of a reactor and a capacitor serially interconnected, a resistor serially connected to said filter to damp filter, rectifier circuit connected across said resistor, and a ripple sensor relay connected across a pair of outputs of said rectifier circuit.

3. An elevator safety device as claimed in claim 1 wherein said emergency braking circuit comprises a dynamic braking circuit formed of at least a set of contacts and a resistor serially connected across an armature of said electric motor to apply a dynamic braking torque to said armature.

4. An elevator safety device comprising an elevator car, a source of alternating current, a controlled semiconductor converter connected to said source of alternating current, a reversible electric motor controllably driven by said source through said semiconductor converter to travel said elevator car, a first direct current reactor connected between said controlled semiconductor converter and said electric motor, a second direct current reactor magnetically coupled to said first reactor and forming a filter with a capacitor serially connected to said second reactor, a rectifier circuit connected across the series combination of said second reactor and said capacitor, a ripple sensor relay connected across a pair of output of said rectifer circuit to be operative with a ripple current produced by said semiconductor counter and inoperative in response to the disappearance of said ripple current, and an emergency braking circuit for urgently braking said electric motor in response to said ripple sensor relay being brought into its inoperative state.

5. An elevator safety device as claimed in claim 4 wherein said emergency braking comprises includes a dynamic braking circuit formed of at least a set of contacts and serially connected across an armature of said electric motor to apply a dynamic braking torque to said armature.

* * * * *